(12) United States Patent
Tanaka

(10) Patent No.: US 8,938,650 B2
(45) Date of Patent: Jan. 20, 2015

(54) ERROR REPORT MANAGEMENT

(75) Inventor: Shun Tanaka, West New York, NJ (US)

(73) Assignee: Ricoh Company, Ltd., Tokyo (JP)

( * ) Notice: Subject to any disclaimer, the term of this patent is extended or adjusted under 35 U.S.C. 154(b) by 494 days.

(21) Appl. No.: 13/036,558

(22) Filed: Feb. 28, 2011

(65) Prior Publication Data

US 2012/0221901 A1  Aug. 30, 2012

(51) Int. Cl.
*G06F 11/30* (2006.01)
*G06F 11/07* (2006.01)
*H04L 12/24* (2006.01)

(52) U.S. Cl.
CPC ........ *G06F 11/0709* (2013.01); *G06F 11/0733* (2013.01); *G06F 11/0748* (2013.01); *G06F 11/0775* (2013.01); *G06F 11/0781* (2013.01); *H04L 41/0618* (2013.01); *H04L 41/0609* (2013.01); *H04L 41/0613* (2013.01)
USPC ............................................. 714/57; 714/48

(58) Field of Classification Search
CPC .......................... G06F 11/0766; G06F 11/0781
USPC ...................................................... 714/48, 57
See application file for complete search history.

(56) References Cited

U.S. PATENT DOCUMENTS

| | | | |
|---|---|---|---|
| 6,006,016 A * | 12/1999 | Faigon et al. | 714/48 |
| 6,144,987 A * | 11/2000 | Niemi | 709/201 |
| 6,711,154 B1 * | 3/2004 | O'Neal | 370/352 |
| 2002/0078017 A1 * | 6/2002 | Cerami et al. | 707/1 |
| 2002/0138638 A1 * | 9/2002 | Hermann et al. | 709/230 |
| 2002/0169870 A1 * | 11/2002 | Vosseler et al. | 709/224 |
| 2003/0023712 A1 * | 1/2003 | Zhao et al. | 709/223 |
| 2003/0023722 A1 * | 1/2003 | Vinberg | 709/224 |
| 2004/0054770 A1 * | 3/2004 | Touboul | 709/223 |
| 2004/0199627 A1 * | 10/2004 | Frietsch | 709/224 |
| 2005/0060070 A1 * | 3/2005 | Kapolka et al. | 701/29 |
| 2006/0005085 A1 * | 1/2006 | Zunino et al. | 714/47 |
| 2006/0239200 A1 * | 10/2006 | Pirzada et al. | 370/252 |
| 2007/0180490 A1 * | 8/2007 | Renzi et al. | 726/1 |
| 2008/0117826 A1 * | 5/2008 | Qiu et al. | 370/242 |
| 2008/0148099 A1 * | 6/2008 | Bhat et al. | 714/25 |
| 2008/0316931 A1 * | 12/2008 | Qiu et al. | 370/245 |
| 2009/0013210 A1 * | 1/2009 | McIntosh et al. | 714/4 |
| 2009/0125757 A1 * | 5/2009 | Knorl et al. | 714/47 |
| 2009/0210104 A1 * | 8/2009 | Bernard et al. | 701/3 |
| 2009/0248859 A1 * | 10/2009 | Roth | 709/224 |
| 2009/0271657 A1 * | 10/2009 | McCombs et al. | 714/6 |
| 2011/0173270 A1 | 7/2011 | Uchida et al. | |
| 2011/0264967 A1 * | 10/2011 | Lovy et al. | 714/49 |
| 2012/0131185 A1 * | 5/2012 | Petersen et al. | 709/224 |
| 2012/0179767 A1 * | 7/2012 | Clarke et al. | 709/206 |

OTHER PUBLICATIONS

U.S. Appl. No. 12/722,367, filed Mar. 11, 2010 of Yuki Uchida et al.
U.S. Appl. No. 12/722,370, filed Mar. 11, 2010 of Yuki Uchida et al.
U.S. Appl. No. 12/722,374, filed Mar. 11, 2010 of Yuki Uchida et al.

(Continued)

*Primary Examiner* — Chae Ko
(74) *Attorney, Agent, or Firm* — Cooper & Dunham LLP

(57) ABSTRACT

Apparatuses, systems and methods are provided for managing error reporting in an information technology environment in which a plurality of information technology devices are connected to a network.

20 Claims, 24 Drawing Sheets

(56) References Cited

OTHER PUBLICATIONS

U.S. Appl. No. 12/722,376, filed Mar. 11, 2010 of Yuki Uchida et al.
U.S. Appl. No. 12/722,381, filed Mar. 11, 2010 of Yuki Uchida et al.
U.S. Appl. No. 12/958,686, filed Dec. 2, 2010 of Shun Tanaka.
U.S. Appl. No. 13/014,384, filed Jan. 26, 2011 of Shun Tanaka.
U.S. Appl. No. 13/036,455, filed Feb. 28, 2011 of Shun Tanaka.
U.S. Appl. No. 13/036,644, filed Feb. 28, 2011 of Shun Tanaka.
U.S. Appl. No. 13/036,745, filed Feb. 28, 2011 of Shun Tanaka et al.
U.S. Appl. No. 13/086,608, filed Apr. 14, 2011 of Shun Tanaka et al.
U.S. Appl. No. 13/086,779, filed Apr. 14, 2011 of Shun Tanaka et al.

* cited by examiner

Error Report

Specified Criteria:

Device Location = Office Room 405 (John Smith)    or
Associated User = John Smith (CEO)    or
Device Type = Printer Alert Notifications Satisfying Specified Criteria:

Terminal          : Operating System Malfunction
MFD               : Max. Storage Capacity Reached
Printer           : Paper Jam

Fig. 5A

| DEVICE LOCATION INFORMATION ||
|---|---|
| Device | Current Location |
| Terminal 15-1 | Conference Room A |
| Scanner 15-2 | Lobby |
| MFD 15-3 | Office Room 405 (John Smith's Office) |
| Printer 15-4 | Office Room 912 (David A's Office) |

Fig. 5B

| USER IDENTIFICATION INFORMATION ||
|---|---|
| Device | User |
| Terminal 15-1 | John Smith (CEO) |
| Scanner 15-2 | Jane Doe |
| MFD 15-3 | John Smith (CEO) |
| Printer 15-4 | David A. |

Fig. 5C

| DEVICE TYPE INFORMATION | |
|---|---|
| Device | Type |
| Terminal 15-1 | Terminal |
| Scanner 15-2 | Scanner |
| MFD 15-3 | MFD |
| Printer 15-4 | Printer |

Fig. 11

| LOCATION-PRIORITY INFORMATION ||
|---|---|
| Location | Priority Level |
| Satellite Building, Floor 1 | 1 |
| Lobby | 2 |
| Office Room 912 (David A's Office) | 3 |
| Conference Room A | 4 |
| Office Room 405 (John Smith's Office) | 5 |

Fig. 13

| USER-PRIORITY INFORMATION ||
|---|---|
| User | Priority Level |
| David Alpha | 1 |
| Michael S. | 2 |
| Jane Doe | 3 |
| David A. | 4 |
| John Smith (CEO) | 5 |

Fig. 15

| DESTINATION INFORMATION | |
|---|---|
| Priority Level | Notification Destination |
| 1 | email_abc@corporation.com |
| 2 | email_abc@corporation.com |
| 3 | email_abc@corporation.com |
| 4 | highpriority@xyz.com |
| 5 | emergency@sti.com |

ERROR REPORT MANAGEMENT

TECHNICAL FIELD

This disclosure relates to tools (systems, apparatuses, methodologies, computer program products, etc.) for managing error reporting in an information technology environment in which a plurality of information technology devices are connected to a network.

BACKGROUND

In the current information age, information technology (IT) tools are extensively used in enterprises and other organizations in order to facilitate processing of documents and data. IT administrators typically have the responsibilities of monitoring and managing IT assets, such as computers, printers, scanners, multi-function devices (MFDs) and other network-connected or standalone devices.

IT management tools (such as application software) are available to IT administrators to assist the administrators with performing their duties. Such management applications commonly include an alert notification feature wherein a notification is transmitted to an administrator to notify the administrator of any of various predetermined notable, or even dangerous or potentially dangerous, conditions within the IT environment that the administrator oversees. For example, when a problem or alert condition occurs in or at a network-connected device, an alert notification may be generated and transmitted to the administrator to inform the administrator of the problem or condition.

There is a drawback, however, in that a large number of alert notifications may be transmitted to the IT administrator, such as when, for example, the administrator oversees a large number of IT assets. Such large numbers of alert notifications may overwhelm the IT administrator, and affect the ability of the administrator to efficiently manage the IT environment. For example, it may become difficult for the IT administrator to differentiate between an alert notification identifying an error occurring at a device performing a non-critical function, and an alert notification identifying an error occurring at a device performing a critical function (such as a device needed for an important meeting or conference, or a device needed by an executive or a high-level official) that requires immediate attention.

There exists a need for improvements to error report management within an IT system.

SUMMARY

In an aspect of this disclosure, there is provided a tool (for example, an apparatus, application software, etc.) to an information technology (IT) administrator, to help with management of IT assets. Such tool (including, for example, a monitoring part) monitors for alert notifications from such IT assets indicating the occurrence of one or more errors at the network-connected IT assets, and then processes (such as via a processing part) the alert notifications to filter the alert notifications based on specified criteria, and generates and outputs an error report that indicates only specific ones of the alert notifications that meet the specified criteria and does not indicate any alert notification that does not meet the specified criteria.

The specified criteria may include one or more of various conditions. For example, the specified criteria may be a current location of a corresponding network device, a user associated with a corresponding network device, or a device type (e.g. a type, name, label or title) of a corresponding network device.

In another aspect, the specified criteria includes one or more keywords, and at least one alert notification that includes one or more of the keywords is included in the error report.

In another aspect, each of the alert notifications are associated with a priority level, based on a current location of the corresponding network device. The alert notifications are processed based on the associated priority levels to filter the alert notifications based on the specified criteria, and there is generated an error report indicating only specific ones of the alert notifications matching the specified criteria, the specified criteria being a specific or higher priority level.

In another aspect, location-priority information may be registered, the location-priority information identifying a plurality of locations and, for each of the locations, a corresponding priority level. If it is determined, based on device location information indicating a current location of a first network device, that the first network device is located at a first location indentified in the location-priority information, then the alert notification is associated with a first priority level corresponding to the first location (as identified in the location-priority information).

In another aspect, each of the alert notifications is associated with a priority level, based on a current user of the corresponding network device. The alert notifications are then processed based on the associated priority levels to filter the alert notifications based on specified criteria, and there is generated an error report indicating only specific ones of the alert notifications matching the specified criteria, the specified criteria being a specific or higher priority level.

In another aspect, user-priority information may be registered, the user-priority information identifying a plurality of users and, for each of the users, a corresponding priority level. If it is determined, based on user identification information indicating a current user of a first network device, that a first user identified in the user-priority information is the current user of the first network device, then that alert notification is associated with a first priority level corresponding to the first user (as identified in the user-priority information).

In another aspect, each of the alert notifications is associated with a priority level, and each of the alert notifications is selectively transmitted to one of a plurality of notification destinations, based on the associated priority level of the alert notification.

In another aspect, each of the alert notifications is associated with a priority level, and destination information is registered, the destination information identifying a plurality of priority levels and, for each of the priority levels, a corresponding notification destination. Each alert notification is selectively transmitted to the notification destination corresponding to the associated priority level of the alert notification.

BRIEF DESCRIPTION OF THE DRAWINGS

The aforementioned and other aspects, features and advantages can be more readily understood from the following detailed description with reference to the accompanying drawings wherein:

FIG. 5A shows an example of a table registering device location information for each of various network devices, such as network devices 15-1 through 15-4 depicted in FIG. 1;

FIG. 5B shows an example of a table registering user identification information for each of various network devices, such as network devices 15-1 through 15-4 depicted in FIG. 1;

FIG. 5C shows an example of a table registering device type information for each of various network devices, such as network devices 15-1 through 15-4 depicted in FIG. 1;

FIG. 11 shows an example of a table registering location-priority information for each of various locations;

FIG. 13 shows an example of a table registering user-priority information for each of various users;

FIG. 15 shows an example of a table registering destination information, according to another exemplary embodiment of this disclosure;

DETAILED DESCRIPTION

Figure 1:
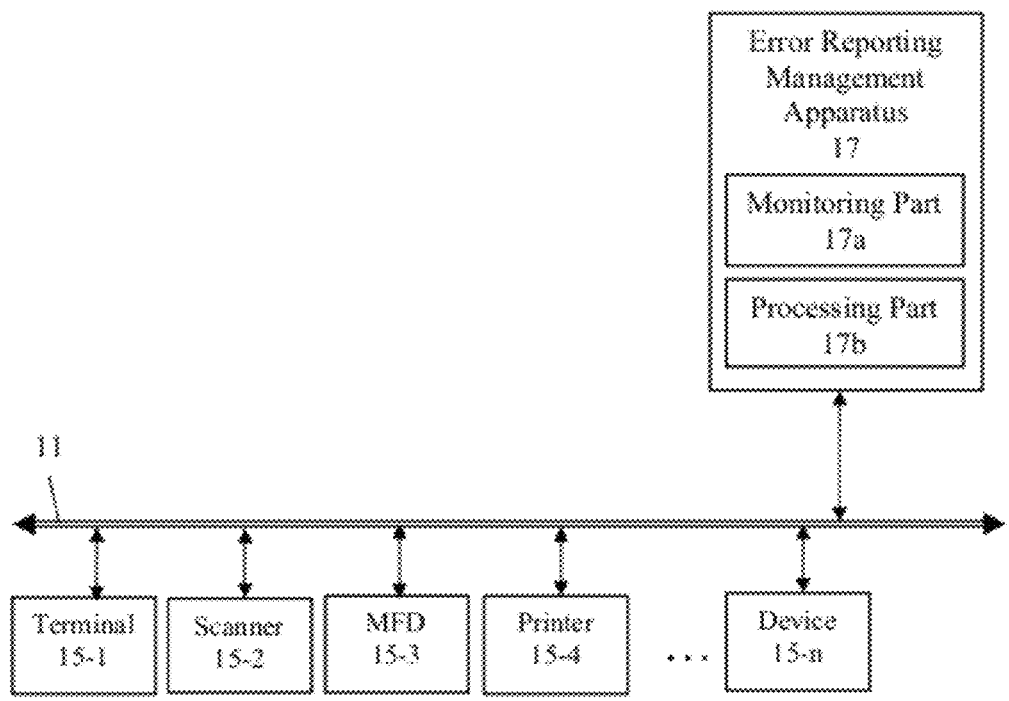
FIG. 1 shows a block diagram of a system, according to an exemplary embodiment of this disclosure.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the subject matter of the present invention.

Referring now to the drawings, wherein like reference numerals designate identical or corresponding parts throughout the several views, there is described tools (systems, apparatuses, methodologies, computer program products, etc.) for managing information technology devices, such as computers, printers, scanners, multi-function devices, and other network-connected, or standalone devices, and for managing error reporting in a network to which a plurality of such information technology devices are connected.

For example, FIG. 1 shows schematically a system 100 for managing error reporting in a network to which a plurality of network devices are connected, according to an exemplary embodiment. System 100 includes a plurality of network devices (i.e. network-connected devices) 15-1 through 15-4 and an error reporting management apparatus 17, all interconnected by a network 11. The plurality of network devices 15-1 through 15-4 includes, for example, a terminal 15-1, scanner 15-2, MFD 15-3 and printer 15-4. While the examples of this disclosure will simply refer to network devices 15-1 through 15-4 in the interests of brevity, the aspects of this disclosure are applicable to a network having an arbitrary number of devices 15-1 . . . 15-$n$, as illustrated in FIG. 1.

Error reporting management apparatus 17 of FIG. 1 includes a monitoring part 17a and a processing part 17b.

The monitoring part 17a of the error reporting management apparatus 17 is configured to monitor for alert notifications from any of the plurality of network device 15-1 through 15-4. For example, the monitoring part 17a may monitor the network 11 directly, and detect and receive one or more alert notifications transmitted to the network from any of the plurality of network devices 15-1 through 15-4. Alternatively, the monitoring part 17a may access an alert notification storage part (not shown) of the error reporting management apparatus 17 that is configured store one or more alert notifications received from any of the plurality of network device 15-1 through 15-4.

The management apparatus 17 may receive the alert notifications by repeatedly transmitting requests (via the monitoring part 17a or a communication part) to the network devices 15-1 through 15-4 via the network 11, inquiring as to the status of each network device. In response, each network device may transmit alert notifications back to the error reporting management apparatus 17, wherein each alert notification indicates whether an error exists or has occurred at the network device. Alternatively, each network device 15-1 through 15-4 may automatically transmit alert notifications to the error reporting management apparatus 17 (without waiting for requests or queries from the error reporting management apparatus 17), whenever an error occurs at the network device. The monitoring part may include locally resident hardware and/or software agents installed locally on each of the network devices 15-1 through 15-4, which are configured to transmit the alert notifications directly to a communication part of the error reporting management apparatus 17 (or to the monitoring part 17a installed at the error reporting management apparatus 17). Once the monitoring part 17a has obtained an alert notification, the monitoring part forwards the alert notification to the processing part 17b for further processing, as discussed below.

Figure 2:
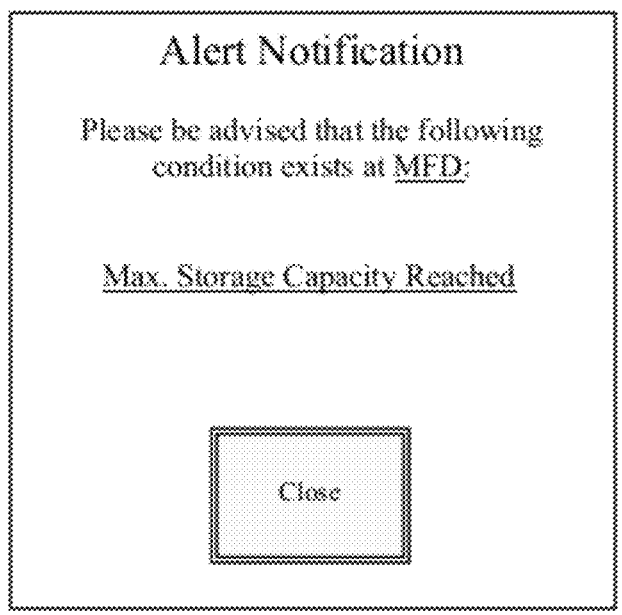
FIG. 2 illustrates an example of an alert notification received by an error reporting management apparatus, such as error reporting management apparatus 17 depicted in FIG. 1.

As described in this disclosure, an alert notification is any type of data, signal or message transmitted from a network device that indicates a current state, condition, and/or status of the network device, or indicates whether some error or scenario exists or is currently in effect with respect to the network device. For example, an alert notification may indicate that the device is malfunctioning, the device is experiencing a paper jam, the device is out of paper, the device is out of ink, the device is not connected to a network, a storage unit of the device has reached maximum capacity, and so forth. In this way, the alert notification may indicate a problem that requires attention or rectification. FIG. 2 illustrates an example of an alert notification transmitted from the network device 15-3 (i.e. MFD), and received at the error reporting management apparatus 17. In particular, FIG. 2 illustrates an example of an alert notification in the form of an electronic message transmitted to the error reporting management apparatus and being displayed to an administrator on a user interface screen of a display unit of the management apparatus 17. The alert notification indicates that the maximum storage capacity of the MFD has been reached. The alert notification need not be a displayable electronic message, such as that depicted in FIG. 2, but may be any type of data, signal or message transmitted from a network device.

The processing part 17b of the error reporting management apparatus 17 is configured to process the alert notifications received by the monitoring part 17a to filter the alert notifications based on specified criteria. The processing part 17b is further configured to generate and output an error report that indicates only specific ones of the alert notifications that meet the specified criteria and does not indicate any alert notification that does not meet the specified criteria.

According to this exemplary embodiment, the specified criteria may relate to, for example, a current location of a network device that is the subject of an alert notification, a user associated with a network device that is the subject of an alert notification, or a type of a network device that is the subject of an alert notification. Thus, the error report will indicate only specific ones of any alert notifications, received from the network devices 15-1 through 15-4, which satisfy the specified criteria.

Figure 3A:
FIGS. 3A and 3B illustrate examples of user interface screens, which may be displayed according to an exemplary embodiment of this disclosure.

The specified criteria may be user-specified criteria specified by, for example, an administrator of the network. FIG. 3A illustrates an example of a user interface screen displayed on a display part of the management apparatus 17, wherein the user interface screen identifies all of the alert notifications received at the error reporting management apparatus 17 (i.e. without any specified criteria being considered). As seen in FIG. 3A, the total number of alert notifications received at the apparatus 17 may be quite large, and thus, the user interface includes a "CLICK TO SPECIFY CRITERIA" button or similar feature allowing the user to specify criteria for use by the apparatus 17 when filtering the alert notifications (and generating an error report indicating only specific ones of the alert notifications matching the specified criteria).

Figure 3B:

In this example, after the user selects the "CLICK TO SPECIFY CRITERIA" button, the error reporting management apparatus 17 may present another user interface screen on a display part (not shown) of the error reporting management apparatus. An example of such a user interface screen is depicted in FIG. 3B. As seen in FIG. 3B, the user interface screen includes radio buttons to allow an administrator or user of the apparatus 17 to select one or more categories of criteria (e.g. device location, associated user and device type) via the radio buttons. The user interface screen includes pull-down menus to allow an administrator/user to select the corresponding entries for the desired criteria categories (e.g. the different locations for the device location criteria, different users for the associated user criteria, etc.). The user interface screen also includes pull-down menus to allow an administrator/user to specify the conditional relationships (such as 'and', 'or') to be applied between the different criteria categories (e.g. the alert notification must satisfy the device location criteria and the user criteria, or the alert notification must satisfy the device location criteria or the user criteria, etc.). Once the user specifies the criteria and clicks on the "SUBMIT" button, the processing part 17b filters the alert notifications based on the specified criteria, and generates and outputs an error report that indicates only specific ones of the alert notifications that meet the specified criteria (and does not indicate any alert notification that does not meet the specified criteria), as described in more detail below.

Figure 4:
FIG. 4 illustrates an example of an error report generated by an error reporting management apparatus, such as error reporting management apparatus 17 depicted in FIG. 1.

An example of an error report subsequently generated by the processing part 17b is depicted in FIG. 4. In the example illustrated in FIG. 4, the specified criteria used to generate the error report is that a device location of a network device is "Office Room 405 (John Smith)", or a user of a network device is "John Smith (CEO)", or a device type of a network device is "Printer". As a result of processing performed processing part 17b described in further detail below, the error report indicates only the alert notifications received at the error reporting management apparatus 17 meeting the specified criteria. Put another way, the error report indicates only the alert notifications received from network devices that satisfy the aforementioned criteria, i.e. any network devices located in Office Room 405 (John Smith's office), or any network devices having John Smith (CEO) as a designated user, or any network device having a device type "Printer".

As illustrated in FIG. 4, the error report may be displayed on a user interface screen on a display part (not shown) of the error reporting management apparatus 17. The management apparatus 17 may be configured to allow a user to select one of the alert notifications listed as satisfying the specified criteria, and to then display further information regarding the corresponding alert notification to the user. For example, if the user selects the listing "MFD:Max. Storage Capacity Reached" in the error report illustrated in the example of FIG. 4, then the user may be presented with the alert notification as illustrated in FIG. 2.

In order to generate the error report based on specified device location criteria, the error reporting management apparatus 17 of this exemplary embodiment may store device location information indicating current locations of corresponding network devices. An example of device location information is depicted in FIG. 5A. The device location information may list a plurality of network devices, such as network devices 15-1 through 15-4 depicted in FIG. 1. The device location information may also list, for each of the network devices, a corresponding current location of the device. For example, it can be seen in the device location information of FIG. 5A that the network device 15-1 is located in Conference Room A, the network device 15-3 is located in Office Room 405 (John Smith's Office), and so forth.

Thus, if the specified criteria is that a network device is located in a specified location, the error reporting management apparatus 17 may refer to the stored device location information in order to determine which network device is located at the specified location. For example, if the specified location is Office Room 405 (John Smith's Office), then the management apparatus 17 may refer to the device location information in the example of FIG. 5A and determine that only network device 15-3 (MFD) is located in Office Room 405 (John Smith's Office). Thereafter, the processing part 17b filters the alert notifications to select any alert notifications received from network device 15-3 (MFD). For example, the processing part 17b may filter the alert notifications by performing a text and/or data comparison between the specified criteria and the data included in a specific portion (e.g. message header, 'sender' identification portion, body portion, etc.) of the alert notifications transmitted from the network devices. The error reporting management apparatus 17 then generates the error report indicating the alert notifications received from the network device MFD.

In order to generate the error report based on specified user criteria, the error reporting management apparatus 17 of this exemplary embodiment may store user identification information indicating current user(s) associated with corresponding network devices. An example of user identification information is depicted in FIG. 5B. The user identification information may list a plurality of network devices, such as network devices 15-1 through 15-4 depicted in FIG. 1. The user identification information may also list, for each of the network devices, a corresponding designated user of the device or user associated with the network device. For example, it can be seen in the user identification information of FIG. 5B that John Smith (CEO) is the user associated with the network devices 15-1 and 15-3.

Thus, if the specified criteria is that a network device is associated with a specified designated user, the error reporting management apparatus 17 may refer to the stored user identification information in order to determine which network device is associated with the specified user. For example, if the specified user is John Smith (CEO), then the management apparatus 17 may refer to the user identification information in the example of FIG. 5B and determine that only network devices 15-1 (Terminal) and 15-3 (MFD) are associated with the designated user John Smith (CEO). Thereafter, the processing part 17b filters the alert notifications to select any alert notifications received from the Terminal 15-1 and MFD 15-3. For example, the processing part 17b may filter the alert notifications by performing a text and/or data comparison between the specified criteria and the data included in a specific portion (e.g. message header, 'sender' identification portion, body portion, etc.) of the alert notifications transmitted from the network devices. The error reporting management apparatus 17 then generates the error report indicating the alert notifications received from the Terminal 15-1 and MFD 15-3.

In order to generate the error report based on a specified device type, the error reporting management apparatus 17 of this exemplary embodiment may store device type information indicating a type of the corresponding network devices. An example of device type information is depicted in FIG. 5C. The device type information may list a plurality of network devices, such as network devices 15-1 through 15-4 depicted in FIG. 1. The device type information may also list, for each of the network devices, a corresponding device type of the device. For example, it can be seen in the device type information of FIG. 5C that the network device 15-1 has a device type "Terminal", the network device 15-4 has a device type "Printer", and so forth. (While the examples of a device type have thus far referred to general device types, such as "Terminal" or "Printer", a type of device may instead or in addition refer to a device name, device model number, device brand, device label, device title, and so forth, such as "Ricoh Aficio SP 5100N").

Thus, if the specified criteria is that a network device has a specified type, the error reporting management apparatus 17 may refer to the stored device type information in order to determine which network device has the specified type. For example, if the specified type is "Printer", then the management apparatus 17 may refer to the device type information in the example of FIG. 5C and determine that only the network device 15-4 (Printer) has a device type "Printer". Thereafter, the processing part 17b filters the alert notifications to select any alert notifications received from the Printer 15-4. For example, the processing part 17b may filter the alert notifications by performing a text and/or data comparison between the specified criteria and the data included in a specific portion (e.g. message header, 'sender' identification portion, body portion, etc.) of the alert notifications transmitted from the network devices. The error reporting management apparatus 17 then generates the error report indicating the alert notifications received from the Printer 15-4.

The information depicted in FIGS. 5A through 5C is merely exemplary, and other matter may be included in the device location information, user identification information, and device type information. Further, the error reporting management apparatus 17 may allow an administrator to change the device location information, user identification information, and device type information as desired. For example, the error reporting management apparatus 17 may include a user interface configured to allow an administrator to change the designated users corresponding to each network device, as illustrated in FIG. 5B.

Thus, according to this exemplary embodiment, after an error reporting management apparatus receives one or more alert notifications from a plurality of network-connected devices, the apparatus processes the alert notifications to filter the alert notifications based on specified criteria, and the error reporting management apparatus generates an error report that indicates only specific ones of the alert notifications matching specified criteria. For instance, the error report may indicate only alert notifications received from network devices being located at a specified location, and/or network devices having a specified user, and/or network devices having a specified type. Accordingly, the administrator is only notified of the most important and pertinent alert notifications, and the administrator is not overwhelmed with a large number of alert notifications.

The error reporting management apparatus of this disclosure may be realized by a computer program product including a computer-usable, non-transient medium (such as a disk storage apparatus) having instructions tangibly embodied therein that are executed by a computer. Thus, it should be understood that the error reporting management apparatus may be executed on a computer. While the error reporting management apparatus is shown as being external to the network devices, the error reporting management apparatus may in fact be executed on a client terminal and/or network-connected device.

The error reporting management apparatus may include a data store that can comprise one or more structural or functional parts that have or support a storage function. For example, the data store can be, or can be a component of, a source of electronic data, such as a document access apparatus, a backend server connected to a document access apparatus, an e-mail server, a file server, a multi-function peripheral device (MFP or MFD), a voice data server, an application server, a computer, a network apparatus, a terminal etc. It should be appreciated that the term "electronic document" or "electronic data", as used herein, in its broadest sense, can comprise any data that a user may wish to access, retrieve, review, etc.

The network 11 can include one or more of a secure intranet or extranet local area network, a wide area network, any type of network that allows secure access, etc., or a combination thereof. Further, other secure communications links (such as a virtual private network, a wireless link, etc.) may be used as well in the network 11. In addition, the network 11 preferably uses TCP/IP (Transmission Control Protocol/Internet Protocol), but other protocols can also be used. How devices can connect to and communicate over the network 11 is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 6:
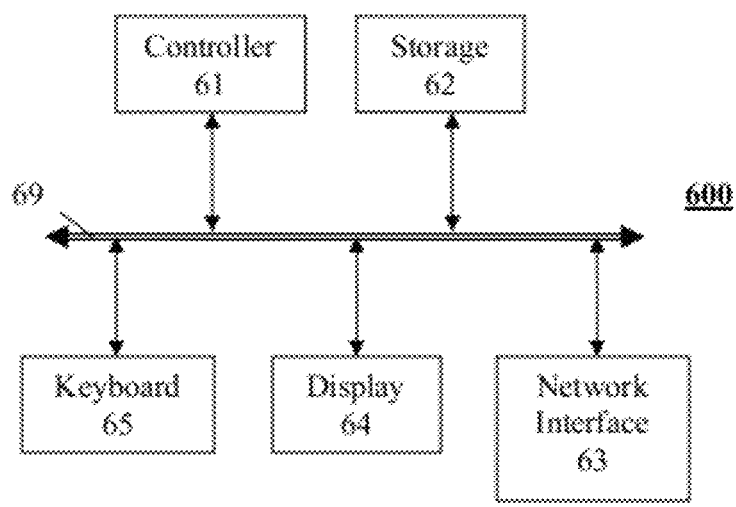
FIG. 6 shows a block diagram of an exemplary configuration of a computer that can be used to implement an error reporting management apparatus, such as error reporting management apparatus 17 of FIG. 1.

FIG. 6 shows an exemplary constitution of an error reporting management apparatus 600 as a computer, for example, that can be configured through software to provide the error reporting management apparatus 17 of FIG. 1. As shown in FIG. 6, the error reporting management apparatus 600 includes a controller (or central processing unit) 61 that communicates with a number of other components, including memory or storage part 62, network interface 63, display 64 and keyboard 65, by way of a system bus 69.

The error reporting management apparatus 600 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as will be appreciated to those skilled in the relevant arts.

In error reporting management apparatus 600, the controller 61 executes program code instructions that controls device operations. The controller 61, memory/storage 62, network interface 63, display 64 and keyboard 65 are conventional, and therefore in order to avoid occluding the inventive aspects of this disclosure, such conventional aspects will not be discussed in detail herein.

The error reporting management apparatus 600 includes the network interface 63 for communications through a network, such as communications through the network 11 with the network devices 15-1 through 15-4 in FIG. 1. However, it should be appreciated that the subject matter of this disclosure is not limited to such configuration. For example, the error reporting management apparatus 600 may communicate with client terminals through direct connections and/or through a network to which some components are not connected. As another example, the error reporting management apparatus 600 need not be provided by a server that services terminals, but rather may communicate with the devices on a peer basis, or in another fashion.

As mentioned above, error reporting management apparatus 17 is not limited to a server or computer, but can be manifested in any of various devices that can be configured to communicate over a network and/or the Internet.

Each of the network-devices 15-1 through 15-4 may be a any network-connected device including but not limited to a personal, notebook or workstation computer, a terminal, a kiosk, a PDA (personal digital assistant), a tablet computing device, a smartphone, a scanner, a printer, a facsimile machine, a multi-function device (MFD), a server, a mobile phone or handset, another information terminal, etc. Each network device may be configured with software allowing the network device to communicate through the network 11 with error reporting management apparatus 17.

The multi-function device 15-3 itself may be any apparatus (including a microprocessor chip or a collection of devices having varying degrees of integration) that has the ability to perform two or more functionalities. The multi-function device 15-3 may be a terminal or any computing device including but not limited to a personal, notebook or workstation computer, a kiosk, a PDA (personal digital assistant), a tablet computing device, a smartphone, a scanner, a printer, a facsimile machine, a server, a mobile phone or handset, another information terminal, etc. The multi-function device 15-3 is configured with software allowing the multi-function device 15-3 to communicate through the network 11 with error reporting management apparatus 17.

Figure 7:
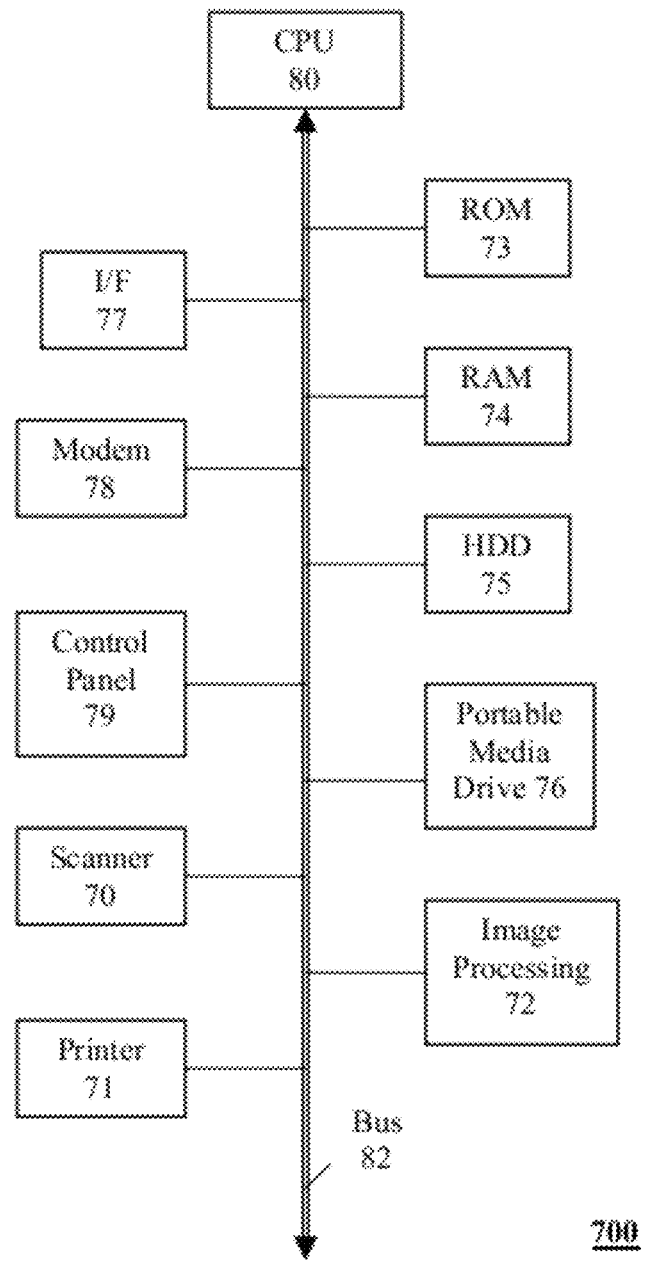
FIG. 7 shows a block diagram of an exemplary configuration of a multi-function device, such as multi-function device 15-3 of FIG. 1.

An example of a configuration of a multi-function device 15-3 is shown schematically in FIG. 7. Device 700 includes a central processing unit (CPU) 80, and various elements connected to the CPU 80 by an internal bus 82. The CPU 80 services multiple tasks while monitoring the state of the device 700. The elements connected to the CPU 80 include a scanner unit 70, a printer unit 71, an image processing device 72, a read only memory (for example, ROM, PROM, EPROM, EEPROM, etc.) 73, a random access memory (RAM) 74, a hard disk drive (HDD) 75, portable media (for example, floppy disk, optical disc, magnetic discs, magneto-optical discs, semiconductor memory cards, etc.) drives 76, a communication interface (I/F) 77, a modem unit 78, and an operation panel 79.

Program code instructions for the device 700 can be stored on the read only memory 73, on the HDD 75, or on portable media and read by the portable media drive 76, transferred to the RAM 74 and executed by the CPU 80 to carry out the instructions. These instructions can include the instructions to the device to perform specified ones of its functions and permit the device 700 to interact with the error reporting management apparatus 17 and to control the operation panel 79 and the image processing unit 72 of the device 700.

The operation panel 79 includes a display screen that displays information allowing the user of the device 700 to operate the device 700. The display screen can be any of various conventional displays (such as a liquid crystal display, a plasma display device, a cathode ray tube display, etc.), but is preferably equipped with a touch sensitive display (for example, liquid crystal display), and configured to provide the GUI based on information input by an operator of the device, so as to allow the operator to conveniently take advantage of the services provided by the system. The display screen does not need to be integral with, or embedded in, the operation panel 79, but may simply be coupled to the operation panel by either a wire or a wireless connection. The operation panel 79 may include keys for inputting information or requesting various operations. Alternatively, the operation panel 79 and the display screen may be operated by a keyboard, a mouse, a remote control, touching the display screen, voice recognition, or eye-movement tracking, or a combination thereof. The device 700 is a multifunction device (with scanner, printer and image processing) and in addition can be utilized as a terminal to download documents from the network 11.

Additional aspects or components of the device 700 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 8:
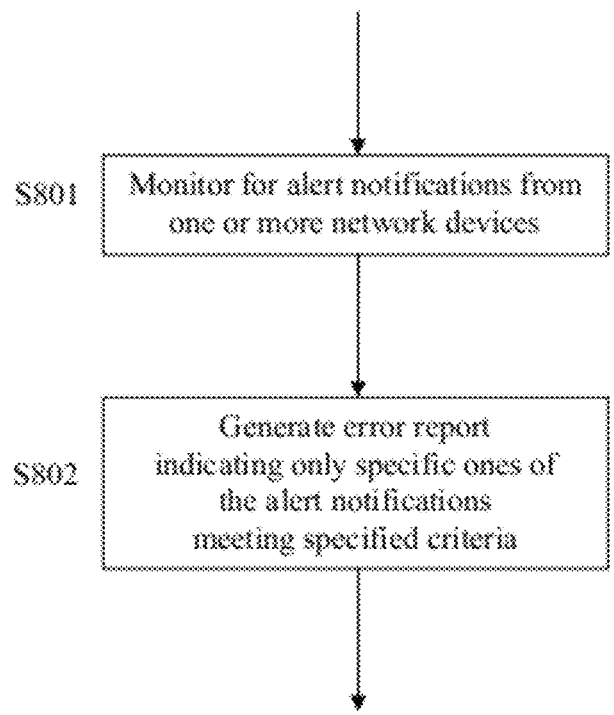
FIG. 8 shows a flowchart of a method performed by an error reporting management apparatus, such as error reporting management apparatus 17 illustrated in FIG. 1, according to an exemplary embodiment of this disclosure.

Turning now to FIG. 8, there is shown a flowchart of a method performed by an error reporting management apparatus, such as error reporting management apparatus 17 illustrated in FIG. 1, according to an exemplary embodiment.

In S801, the error reporting management apparatus monitors for alert notifications from one or more network devices, such as network devices 15-1 through 15-4 depicted in FIG. 1, and receives the alert notifications from the plurality of network devices. In S802, the error reporting management apparatus processes the alert notifications to filter the alert notifications based on specified criteria, and generates and outputs an error report that indicates only specific ones of the alert notifications that meet the specified criteria and does not indicate any alert notification that does not meet the specified criteria. The specified criteria may be, for example, a current location, a designated user, or a type of a network device (where the network device is the subject of an alert notification). An example of an error report generated by the error reporting management apparatus is depicted in FIG. 4.

Figure 9A:
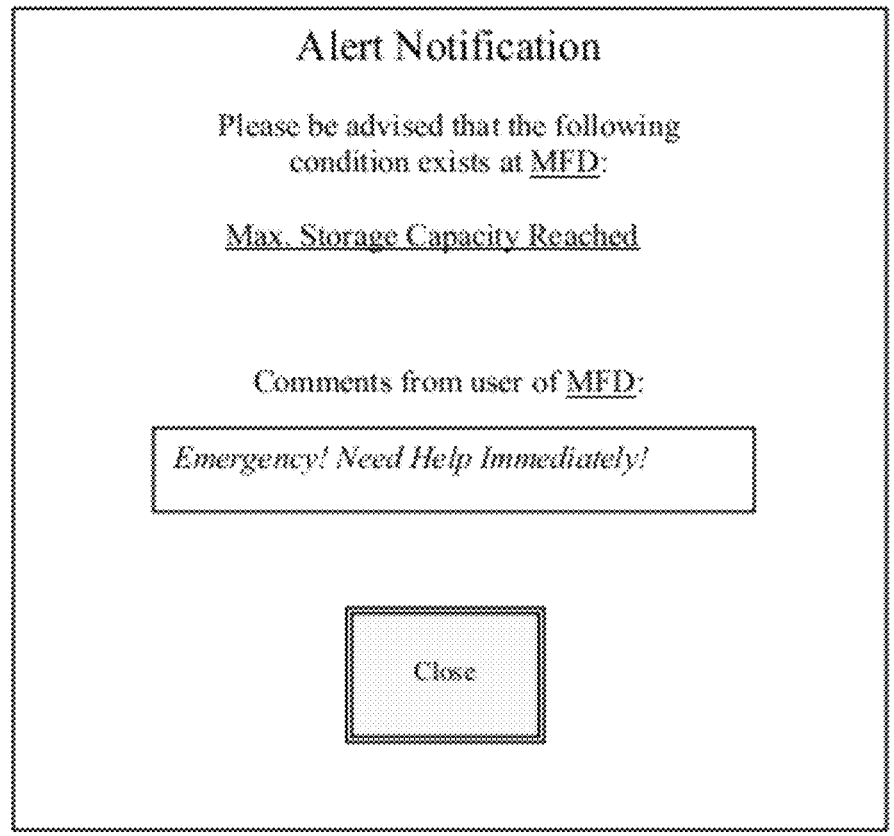
FIG. 9A illustrates an example of an alert notification received by an error reporting management apparatus, such as error reporting management apparatus 17 depicted in FIG. 1, according to another exemplary embodiment of this disclosure.

According to another exemplary embodiment, the specified criteria include one or more keywords, and the processing part 17b includes at least one alert notification that includes (one or more of) the keywords in the error report. This embodiment may be applicable when, for example, the alert notifications received from the plurality of network devices 15-1 through 15-4 may include comments generated by a user of the network device. An example of such an alert notification is depicted in FIG. 9A, wherein the alert notification includes the user comments "Emergency! Need Help Immediately!".

According to this exemplary embodiment, the processing part 17b of the error reporting management apparatus may process the alert notifications in order to generate an error report indicating only specific ones of the alert notifications having user-specified comments matching specified criteria, wherein the specified criteria is one or more keywords. That is, the processing part 17b may analyze comments included in each alert notification received from the plurality of network devices 15-1 thought 15-4, to determine which of the alert notifications includes the specified keywords.

Figure 9B:
FIG. 9B illustrates an example of an error report generated by an error reporting management apparatus, such as error reporting management apparatus 17 depicted in FIG. 1, according to another exemplary embodiment of this disclosure.

For example, if the specified keywords are 'emergency' or 'immediately' then the processing part 17b will filter the alert notifications based on the content of the notifications, and generate an error report such as the one illustrated in FIG. 9B, which indicates that only the alert notification received from network device 15-3 (MFD) includes the specified keywords (illustrated in FIG. 9A) and thus matches the specified criteria. The error reporting management apparatus may provide a user interface screen, similar to the screen illustrated in FIG. 3B, to allow an administrator or user to specify the keywords.

This embodiment is not limited to searching for the presence of keywords in a user comments portion of an alert notification. For example, the specified criteria may be instead be a specified sentiment, and the processing part 17b may determine which of the alert notifications includes user comments having the specified sentiment. The processing part 17b may do so by employing techniques involving sentiment lexicon analysis, natural language processing (NLP) and other techniques understood by those skilled in the art. In the interests of clarity, such techniques will not be discussed in detail in this disclosure.

According to another exemplary embodiment, the error reporting management apparatus may associate each alert notification received from a network device with a priority level. Moreover, the error reporting management apparatus may process the alert notifications to filter the alert notifications based on specified criteria, and generate the error report indicating only specific ones of the alert notifications matching the specified criteria, wherein the specified criteria is defined in relation to a specified priority level.

Figure 10A:
FIG. 10A illustrates an example of an error report generated by an error reporting management apparatus, such as error reporting management apparatus 17 depicted in FIG. 1, according to another exemplary embodiment of this disclosure.
Figure 10B:
FIG. 10B illustrates an example of a user interface screen, which may be displayed according to another exemplary embodiment of this disclosure.

FIG. 10A depicts an example of an error report that indicates only specific ones of alert notifications received from the plurality of network devices 15-1 through 15-4 that match specified criteria, wherein the specified criteria is a priority level of at least 4. The specified criteria may be selected by an administrator or user of the error reporting management apparatus using a user interface screen displayed on a display part of the management apparatus 17. FIG. 10B depicts an example of such a user interface screen, which is configured with pull down menus to allow a user to specify a given priority level (such one of priority levels 1-5), and a given qualifying condition (such as 'equal to', 'at least', 'greater than', 'at most', 'less than', etc.). As described in the examples of this disclosure, the higher the numerical value of the priority level, the greater the priority or 'importance' of the associated alert notification. However, this system is merely exemplary, and other systems or conventions regarding priority levels may be used (e.g. the lower the numerical value of the priority level, the greater the priority or 'importance' of the associated alert notification).

According to an exemplary embodiment, the error reporting management apparatus may associate an alert notification with a priority level based on, for example, a current location of the network device from which the alert notification originates.

According to this embodiment, the error reporting management apparatus 17 stores location-priority information identifying a plurality of locations and, for each of the locations, a corresponding priority level. The location-priority information may be stored in a storage part of the error reporting management apparatus 17. For example, FIG. 6 shows an exemplary constitution of an error reporting management apparatus 600 as a computer, and the location-priority information may be stored in storage part 62 of the error reporting management apparatus 600.

An example of location-priority information is depicted in FIG. 11. In the example of FIG. 11, the location-priority information lists a plurality of locations such as "Lobby", "Conference Room A" and "Office Room 405 (John Smith's Office)". The location-priority information of FIG. 11 also lists, for each of the locations, a corresponding priority level. For example, the priority level corresponding to the location 'Lobby' is 2, the priority level corresponding to the location 'Conference Room A" is 4, and so forth.

The information depicted in FIG. 11 is merely exemplary, and other locations and/or priority levels may be included in the location-priority information. Further, the error reporting management apparatus 17 may allow an administrator to change the location-priority information as desired. For example, the error reporting management apparatus may include a user interface configured to allow an administrator to change the priority levels corresponding to each location illustrated in FIG. 11.

According to this exemplary embodiment, the processing part 17b of the error reporting management apparatus 17 associates each of the alert notifications with a priority level, based on the aforementioned location-priority information and the device location information indicating a current location of the corresponding network device. An example of device location information is depicted in FIG. 5A.

That is, when the processing part 17*b* receives an alert notification from a network device, the processing part determines a current location of the network device, based on the device location information stored by the error reporting management apparatus. If the alert notification is received from Terminal 15-1, for instance, then based on the exemplary device location information of FIG. 5A, the processing part 17*b* determines that a current location of the Terminal 15-1 is Conference Room A.

Thereafter, the processing part refers to the stored location-priority information in order to determine a priority level corresponding to the current location of the network device. If the Terminal 15-1 is located in Conference Room A, for instance, then using the exemplary location-priority information illustrated in FIG. 11, the processing part 17*b* will determine that the priority level corresponding to the current location Conference Room A is 4. The processing part 17*b* then associates the alert notification received from the Terminal 15-1 (located at Conference Room A) with the priority level 4.

The processing part 17*b* may process the alert notifications based on the associated priority levels to filter the alert notifications based on specified criteria, and generate the error report indicating only specific ones of the alert notifications matching the specified criteria, the specified criteria being defined on the basis of priority levels (as illustrated in FIG. 10A). If the specified criteria is a priority level of at least 4, for example, then the error report will indicate only specific ones of alert notifications received from the network devices 15-1 through 15-4 that have an associated priority level of at least 4. For instance, since the alert notification received from Terminal 15-1 (located at Conference Room A) has an associated priority level of 4, this alert notification will be included in the error report generated by the processing part 17*b*, as illustrated in FIG. 10A. Likewise, since an alert notification received from MFD 15-3 (located at Office Room 405) has an associated priority level of 5, this alert notification will be included in the error report generated by the processing part 17*b*, as illustrated in FIG. 10A.

Thus, according to this exemplary embodiment, the error reporting management apparatus 17 associates each of the alert notifications with a priority level, based on a current location of the network device from which the alert notification originates. The error reporting management apparatus may then process the alert notifications to filter the alert notifications based on specified criteria, and generate an error report indicating only specific ones of the alert notifications matching the specified criteria, wherein the specified criteria is, for example, a priority level equal to or greater than a specified value.

Accordingly, an IT administrator may be notified of only the most pertinent alert notifications received from devices operating in important locations. For example, alert notifications received from information technology devices operating in a conference room during an important meeting, or operating in the office of an important company executive, may be accorded a higher priority status, allowing an administrator to more efficiently manage information technology devices connected to a network.

Figure 12A:
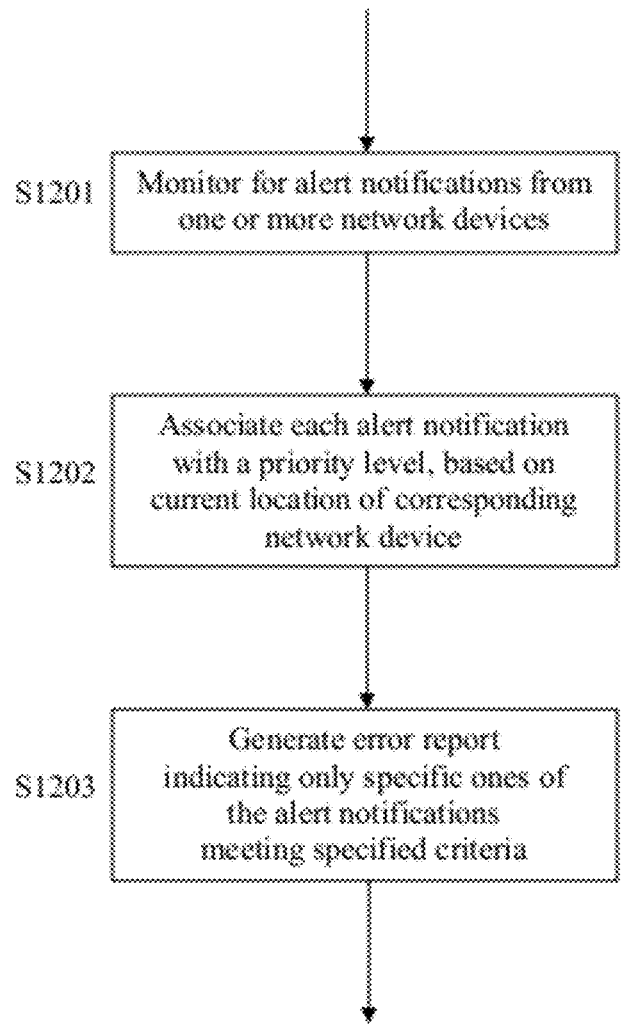
FIGS. 12A and 12B show flowcharts of methods performed by an error reporting management apparatus, such as error reporting management apparatus 17 illustrated in FIG. 1, according to another exemplary embodiment of this disclosure.

Turning now to FIG. 12A, there is shown a flowchart of a method performed by an error reporting management apparatus, such as error reporting management apparatus 17 illustrated in FIG. 1, according to this exemplary embodiment.

In S1201, the error reporting management apparatus monitors for alert notifications from one or more network devices, such as network devices 15-1 through 15-4 depicted in FIG. 1, and receives the alert notifications from the plurality of network devices. In S1202, the error reporting management associates each of the alert notifications with a priority level, based on device location information indicating a current location of the corresponding network device. In S1203, the error reporting management apparatus processes the alert notifications based on the associated priority levels to filter the alert notifications based on specified criteria, and generates and outputs an error report that indicates only specific ones of the alert notifications that meet the specified criteria and does not indicate any alert notification that does not meet the specified criteria.

Figure 12B:
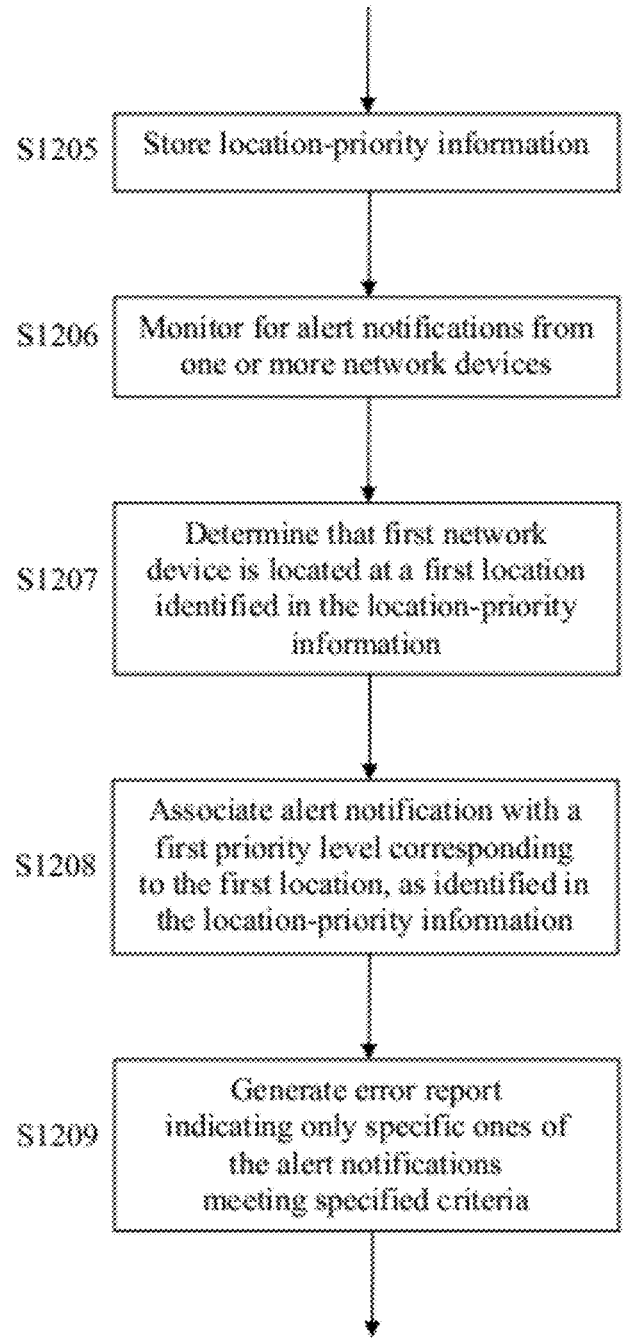

Turning now to FIG. 12B, there is shown a more detailed flowchart of a method performed by an error reporting management apparatus, such as error reporting management apparatus 17 illustrated in FIG. 1, according to this exemplary embodiment.

In S1205, the error reporting management apparatus stores location-priority information identifying a plurality of locations and, for each of the locations, a corresponding priority level. In S1206, the error reporting management apparatus monitors for alert notifications from one or more network devices, such as network devices 15-1 through 15-4 depicted in FIG. 1, and receives an alert notification from a first network device.

Then in S1207, the error reporting management apparatus determines, based on device location information indicating a current location of the first network device, that the first network device is located at a first location indentified in the location-priority information. In S1208, the management apparatus associates the alert notification with a first priority level corresponding to the first location, as identified in the location-priority information. Finally, in S1209, the management apparatus processes received alert notifications based on the associated priority levels to filter the alert notifications based on specified criteria, and generates an error report indicating only specific ones of the alert notifications matching the specified criteria, the specified criteria being a specific or higher priority level.

As described in this disclosure, 'location' may refer to a physical location, a geographic location, a coordinate-based location, a network address location, an IP address location, a network subnet location, and other conventions that may be used to describe location. For example, location may refer to an office location identified using a street address, an office building identifier, an office wing identifier, an office department identifier, an office floor identifier, or an office room identifier. As another example, location may refer to different subnets of a larger network system within an office or enterprise organization (wherein a network device is considered to be at a first location if the network device is connected to a first subnet).

Each of the network devices 15-1 through 15-4 may keep track of its own location using, for example, a built-in global positioning system (GPS) function. In such a case, a network device may transmit device location information indicating the current location of the network device to the error reporting management apparatus 17 via the network 11, and the error reporting management apparatus 17 may then generate the device location information (such as that depicted in FIG. 5A) accordingly. As an alternative, a network device may include an RFID tag and the apparatus 17 may include an RFID reader positioned in a predetermined location, and the apparatus 17 generates the device location information based on sensor readings of the RFID tag generated by the RFID reader. (For example, if the RFID reader is located at a first predetermined location and can detect the RFID tag of the network device, then the network device may be considered to be located at the first predetermined location). The network devices 15-1 through 15-4 and the error reporting management apparatus 17 may generate device location information indicating the current locations of the network devices using other techniques, as understood by those skilled in the art.

According to another exemplary embodiment, the error reporting management apparatus may associate an alert notification with a priority level based on, for example, a current user of the network device from which the alert notification originates.

According to this embodiment, the error reporting management apparatus 17 stores user-priority information identifying a plurality of users and, for each of the user, a corresponding priority level. The user-priority information may be stored in a storage part of the error reporting management apparatus 17. For example, FIG. 6 shows an exemplary constitution of an error reporting management apparatus 600 as a computer, and the user-priority information may be stored in storage part 62 of the error reporting management apparatus 600.

An example of user-priority information is depicted in FIG. 13. In the example of FIG. 13, the user-priority information lists a plurality of user such as "Jane Doe", "David A." and "John Smith (CEO)". The user-priority information of FIG. 13 also lists, for each of the users, a corresponding priority level. For example, the priority level corresponding to the user 'Jane Doe' is 3, the priority level corresponding to the user 'John Smith (CEO)" is 5, and so forth.

The information depicted in FIG. 13 is merely exemplary, and other users and/or priority levels may be included in the user-priority information. Further, the error reporting management apparatus 17 may allow an administrator to change the user-priority information as desired. For example, the error reporting management apparatus 17 may include a user interface configured to allow an administrator to change the priority levels corresponding to each user illustrated in FIG. 13.

According to this exemplary embodiment, the processing part 17*b* of the error reporting management apparatus 17 associates each of the alert notifications with a priority level, based on the aforementioned user-priority information and the user identification information indicating a current user of the corresponding network device. An example of user identification information is depicted in FIG. 5B.

That is, when the processing part 17*b* receives an alert notification from a network device, the processing part determines a current user of the network device, based on the user identification information stored by the error reporting management apparatus. If the alert notification is received from network device Terminal 15-1, for instance, than based on the exemplary user identification information of FIG. 5B, the processing part 17*b* determines that a current user of the Terminal 15-1 is John Smith (CEO).

Thereafter, the processing part refers to the stored user-priority information in order to determine a priority level corresponding to the current user of the network device. If the current user of Terminal 15-1 is John Smith, for instance, then using the exemplary user-priority information illustrated in FIG. 13, the processing part 17*b* will determine that the priority level corresponding to the current user John Smith is 5. The processing part 17*b* then associates the alert notification received from the Terminal 15-1 (having John Smith as a designated user) with the priority level 5.

The processing part 17*b* may process the alert notifications based on the associated priority levels to filter the alert notifications based on specified criteria, and generate the error report indicating only specific ones of the alert notifications matching the specified criteria, the specified criteria being defined on the basis of priority levels. If the specified criteria is a priority level of at least 4, for example, then the error report will indicate only specific ones of alert notifications received from the network devices 15-1 through 15-4 that have an associated priority level of at least 4. For instance, since the alert notification received from Terminal 15-1 (having John Smith as a designated user) has an associated priority level of 5, this alert notification will be included in the error report generated by the processing part 17*b*, as illustrated in FIG. 10A. Likewise, since an alert notification received from MFD 15-3 (having John Smith as a designated user) has an associated priority level of 5, and an alert notification received from Printer 15-4 (having David A. as a designated user) has an associated priority level of 4, both of these alert notification will be included in the error report generated by the processing part 17*b*, as illustrated in FIG. 10A.

Thus, according to this exemplary embodiment, the error reporting management apparatus 17 associates each of the alert notifications with a priority level, based on a current user of the network device from which the alert notification originates. The error reporting management apparatus may then process the alert notifications to filter the alert notifications based on specified criteria, and generate an error report indicating only specific ones of the alert notifications matching the specified criteria, wherein the specified criteria is, for example, a priority level equal to or greater than a specified value.

Accordingly, an IT administrator may be notified of only the most pertinent alert notifications received from devices operated by important users. For example, alert notifications received from information technology devices operated by an important company executive may be accorded a higher priority status, allowing an administrator to more efficiently manage information technology devices connected to a network.

Figure 14A:
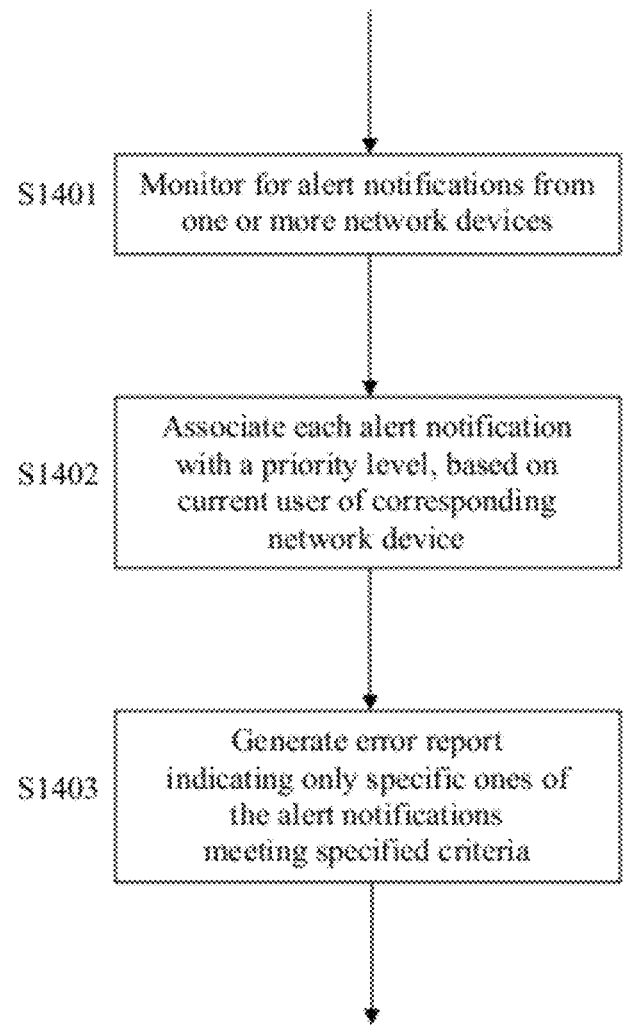
FIGS. 14A and 14B show flowcharts of methods performed by an error reporting management apparatus, such as error reporting management apparatus 17 illustrated in FIG. 1, according to another exemplary embodiment of this disclosure.

Turning now to FIG. 14A, there is shown a flowchart of a method performed by an error reporting management apparatus, such as error reporting management apparatus 17 illustrated in FIG. 1, according to this exemplary embodiment.

In S1401, the error reporting management apparatus monitors for alert notifications from one or more network devices, such as network devices 15-1 through 15-4 depicted in FIG. 1, and receives the alert notifications from the plurality of network devices. In S1402, the error reporting management associates each of the alert notifications with a priority level, based on user identification information indicating a current user of the corresponding network device. In S1403, the error reporting management apparatus processes the alert notifications based on the associated priority levels to filter the alert notifications based on specified criteria, and generates an error report indicating only specific ones of the alert notifications matching the specified criteria, wherein the specified criteria is a specific or higher priority level.

Figure 14B:
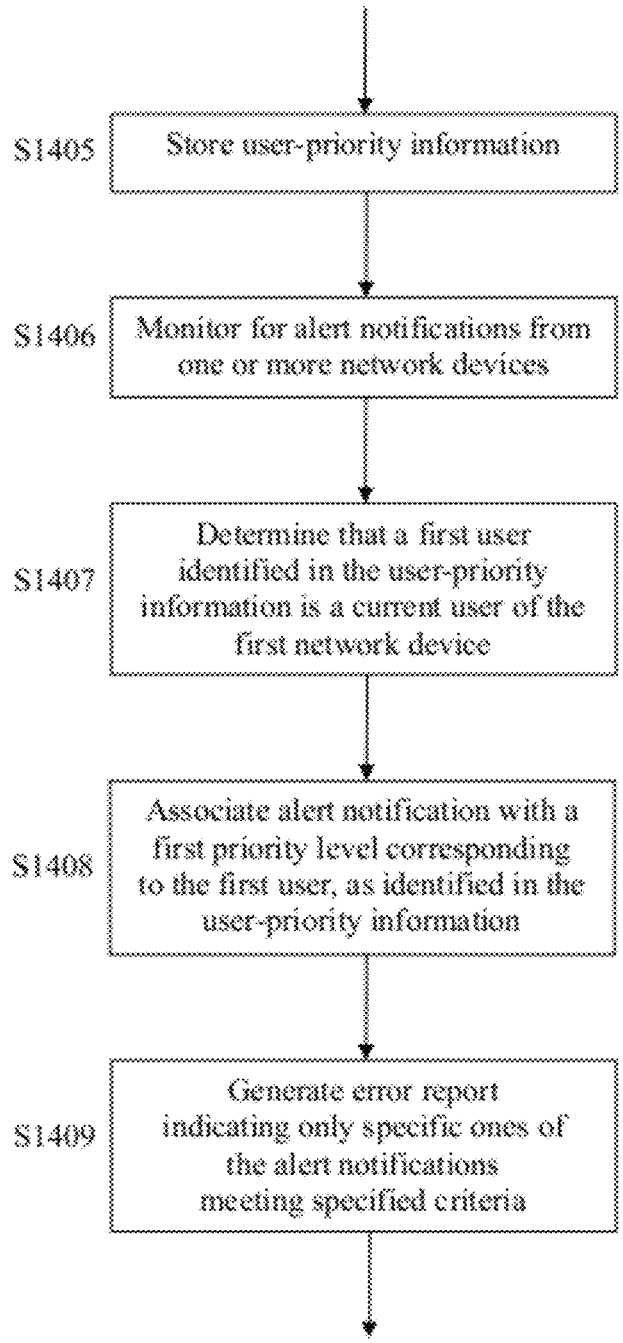

Turning now to FIG. 14B, there is shown a more detailed flowchart of a method performed by an error reporting management apparatus, such as error reporting management apparatus 17 illustrated in FIG. 1, according to this exemplary embodiment.

In S1405, the error reporting management apparatus stores user-priority information identifying a plurality of users and, for each of the users, a corresponding priority level. In S1406, the error reporting management apparatus monitors for alert notifications from one or more network devices, such as network devices 15-1 through 15-4 depicted in FIG. 1, and receives an alert notification from a first network device.

Then in S1407, the error reporting management apparatus determines, based on user identification information indicating a current user of the first network device, that a first user indentified in the user-priority information is a current user of the first network device. In S1408, the management apparatus associates the alert notification with a first priority level corresponding to the first user, as identified in the user-priority information. Finally, in S1409, the management apparatus processes received alert notifications based on the associated priority levels to filter the alert notifications based on specified criteria, and generates an error report indicating only specific ones of the alert notifications matching the specified criteria, the specified criteria being a specific or higher priority level.

According to another exemplary embodiment, once the error reporting management apparatus associates an alert notification with a specific priority level, the apparatus selectively transmits each of the alert notifications to one of a plurality of notification destinations, based on the associated priority level of the alert notification.

According to this embodiment, the error reporting management apparatus 17 stores destination information identifying a plurality of priority levels and, for each of the priority levels, a corresponding notification destination. The destination information may be stored in a storage part of the error reporting management apparatus 17. For example, FIG. 6 shows an exemplary constitution of an error reporting management apparatus 600 as a computer, and the destination information may be stored in storage part 62 of the error reporting management apparatus 600.

An example of destination information is depicted in FIG. 15. In the example of FIG. 15, the destination information lists a plurality of priority levels e.g. levels priority levels 1-5. The destination information of FIG. 15 also lists, for each of the priority levels, a corresponding notification destination. For example, the notification destination corresponding to the priority level 3 is email_abc@corporation.com, the notification destination corresponding to the priority level 5 is emergency@sti.com, and so forth.

The information depicted in FIG. 15 is merely exemplary, and other priority levels and/or notification destinations may be included in the destination information. Further, the error reporting management apparatus 17 may allow an administrator to change the destination information as desired. For example, the error reporting management apparatus 17 may include a user interface configured to allow an administrator to change the notification destinations corresponding to each priority level illustrated in FIG. 15.

According to this exemplary embodiment, after the processing part 17b receives an alert notification from a network device and associates the alert notification with a priority level (based on, for example, a current location or current user of the corresponding network device), the processing part refers to the stored destination information in order to determine a notification destination corresponding to the priority level of the alert notification. If the priority level of the alert notification is 4, for instance, then using the exemplary destination information illustrated in FIG. 15, the processing part 17b will determine that the notification destination corresponding to the alert notification is highpriority@xyz.com. The processing part 17b then selectively transmits the alert notification (or an error reporting describing information related to the alert notification) to the notification destination corresponding to the priority level of the alert notification.

Thus, according to this exemplary embodiment, the error reporting management apparatus 17 transmits information regarding different alert notifications to different destinations, based on the priority of the alert notification. Thus, alert notifications related to more routine errors can be transmitted to a first destination, e.g. a junior network administrator. In contrast, alert notifications describing more serious errors (such as errors with an information technology device operating in a critical location, or being operated by an important individual) can be transmitted to a second destination, e.g. a senior network administrator.

Figure 16:
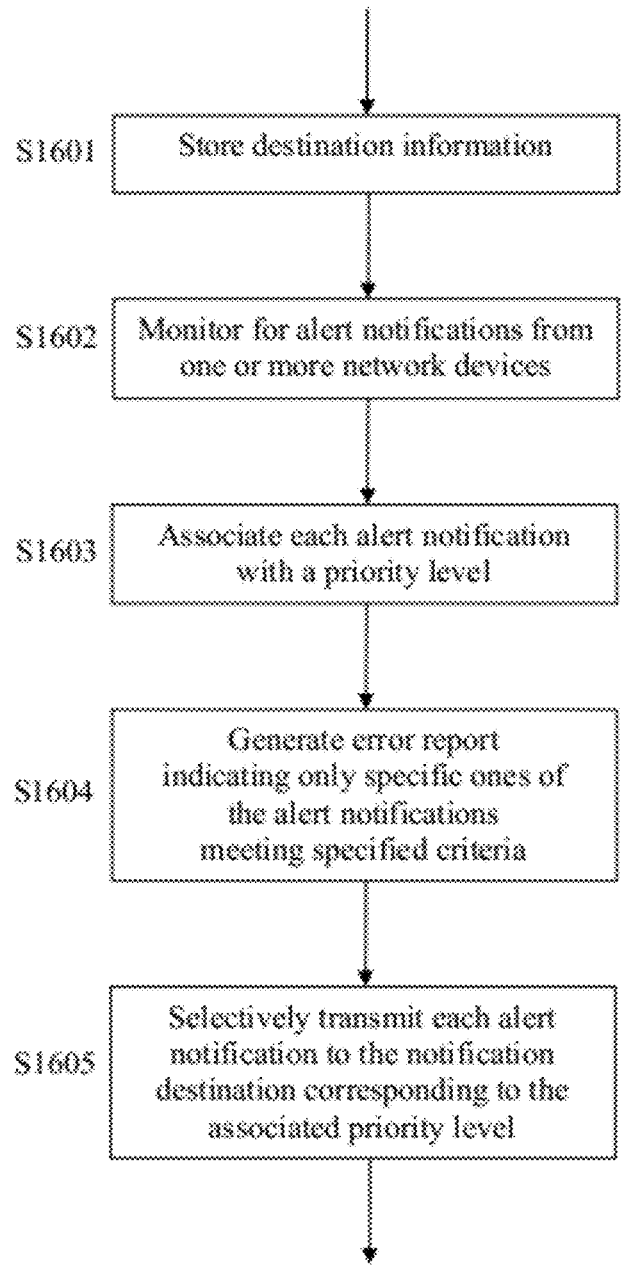
FIG. 16 shows a flowchart of a method performed by an error reporting management apparatus, such as error reporting management apparatus 17 illustrated in FIG. 1, according to another exemplary embodiment of this disclosure.

Turning now to FIG. 16, there is shown a flowchart of a method performed by an error reporting management apparatus, such as error reporting management apparatus 17 illustrated in FIG. 1, according to this exemplary embodiment.

In S1601, the error reporting management apparatus stores destination information identifying a plurality of priority levels and, for each of the priority levels, a corresponding notification destination. In S1602, the error reporting management apparatus monitors for alert notifications from one or more network devices, such as network devices 15-1 through 15-4 depicted in FIG. 1, and receives alert notifications from the plurality of network devices. In S1603, the management apparatus associates each of the alert notifications with a priority level. In S1604, the management apparatus processes received alert notifications based on the associated priority levels to filter the alert notifications based on specified criteria, and generate an error report indicating only specific ones of the alert notifications matching the specified criteria. Finally, in S1605, the management apparatus selectively transmits each alert notification to the notification destination corresponding to the associated priority level of the alert notification, as indicated in the destination information.

While the example shown in FIG. 1 includes one error reporting management apparatus and four network devices, it should be appreciated that such numbers of devices, terminals and apparatuses are arbitrary and are selected as an example in order to facilitate discussion, and that the subject matter of this disclosure can be implemented in a system including one or more systems, servers, apparatuses and terminals. Other devices, such as scanners, printers and multi-function devices may also be connected to a network, as is well known in the art. Further, the error reporting management apparatus and network devices may be connected in a different network arrangement to that depicted in FIG. 1.

In the exemplary embodiment illustrated in FIG. 1, the error reporting management apparatus is depicted as directly including or physically incorporating the monitoring part 17a, and processing part 17b. However, one or more of the aforementioned parts of the error reporting management apparatus may be located externally from the error reporting management apparatus, wherein the error reporting management apparatus accesses remotely the functionalities of these external parts.

Figure 17:
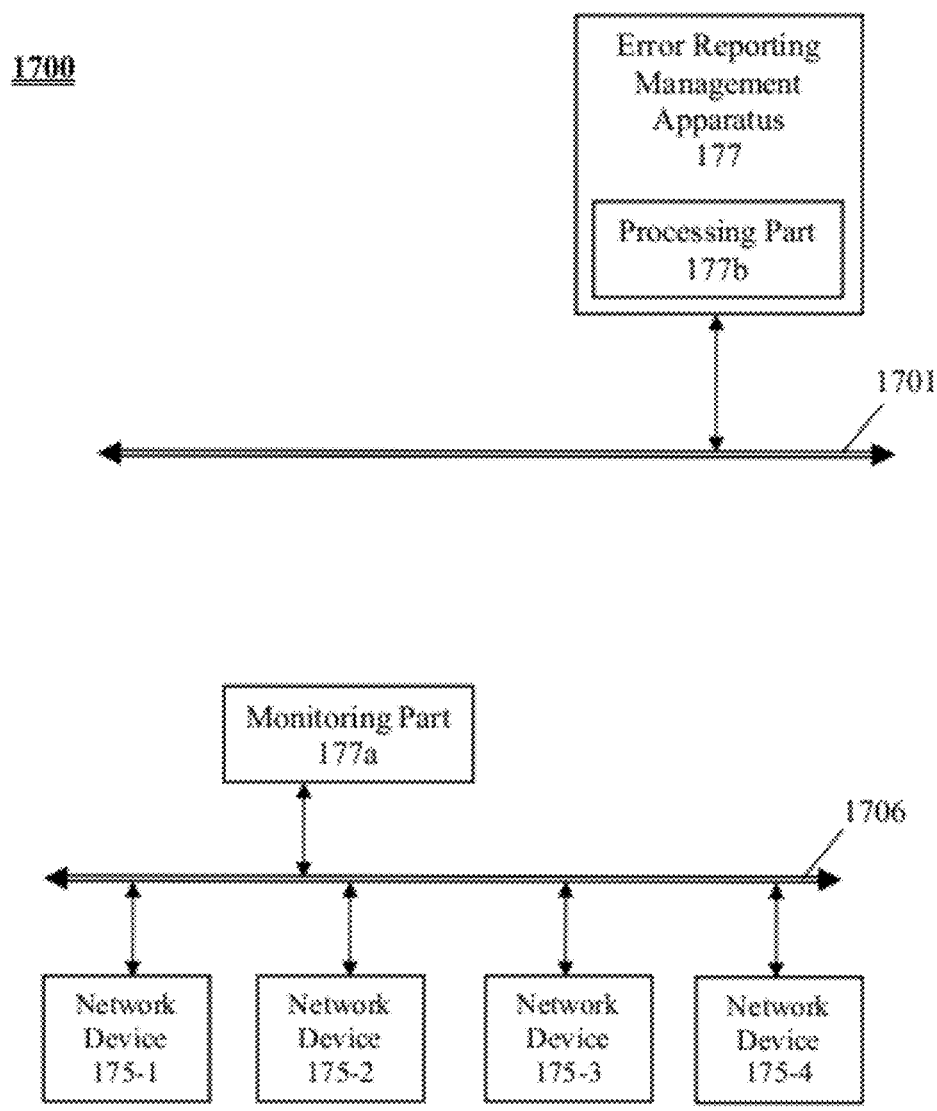
FIG. 17 shows a block diagram of a system, according to another exemplary embodiment of this disclosure.

For example, FIG. 17 illustrates an example of a system 1700 including an error reporting management apparatus 177 connected to network 1701. The error reporting management apparatus 177 may be similar to error reporting management apparatus 17 illustrated in FIG. 1, except that the monitoring part 177a of error reporting management apparatus 177 is remote from the error reporting management apparatus 177 and connected to a network 1706. The monitoring part 177a may receive an alert notification from any one of network devices 175-1 through 175-4 connected to network 1706. Further, the monitoring part 177a may communicate remotely with the processing part 177b of the error reporting management apparatus 177, wherein the content of the communications may indicate the alert notifications received from devices 175-1 through 175-4. The error reporting management apparatus 177 may then generate an error report according to the exemplary embodiments of this disclosure, as described above.

Although the network devices 15-1 through 15-4 depicted in FIG. 1 are shown as being connected to the network 11, the aspects of this disclosure may be applied to a system for managing a device that is not connected to a network. For example, aspects of this disclosure may be applied to a system for managing a device with use of radio-frequency identification (RFID) technology.

Figure 18:
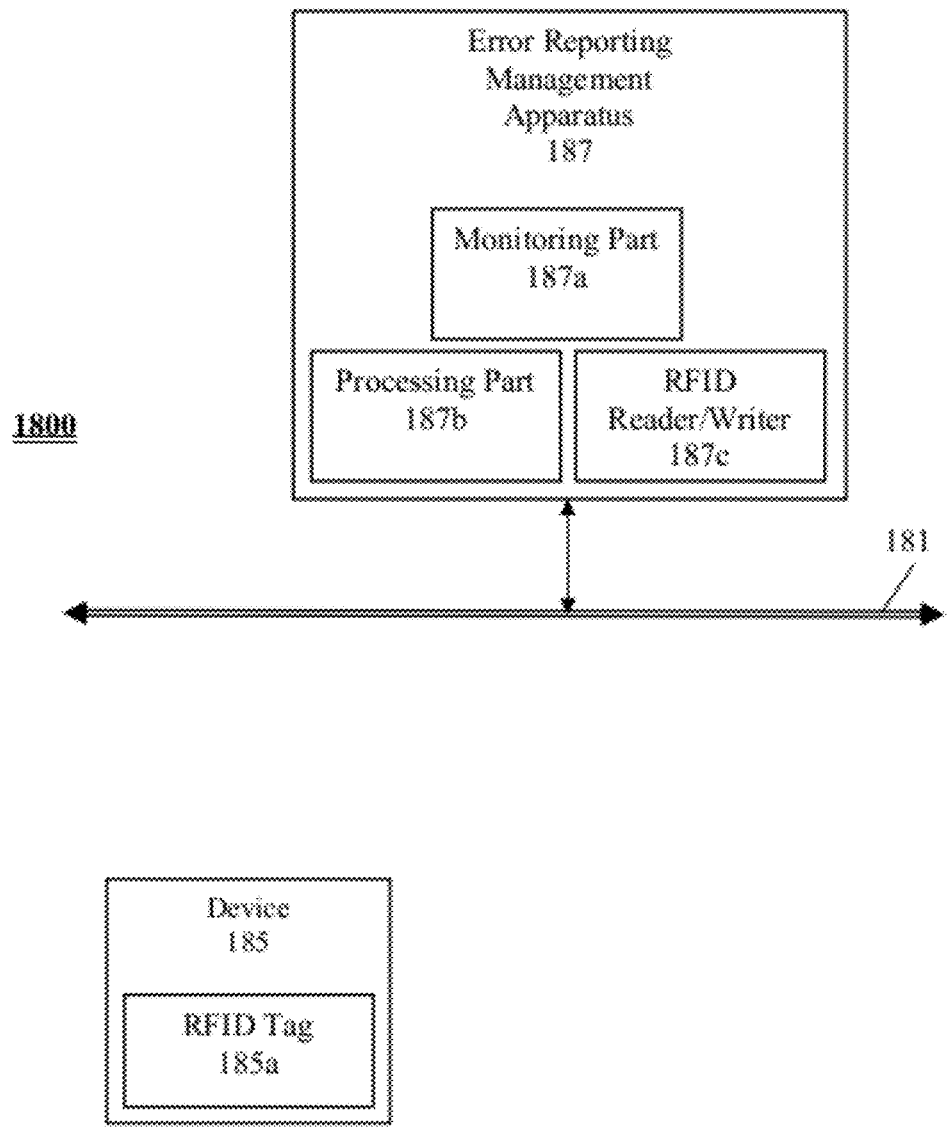
FIG. 18 shows a block diagram of a system, according to another exemplary embodiment of this disclosure.

FIG. 18 depicts an example of a system 1800 according to another exemplary embodiment. The system 1800 includes error reporting management apparatus 187, which may be similar to the error reporting management apparatus 17 depicted in FIG. 1, except that the error reporting management apparatus 187 also includes an RFID Reader/Writer 187*c*. The system 1700 further includes a device 185 which is an IT asset that is not network-connected, (i.e. a standalone device with no network interface), such as an electronic stapler, shredder, etc. The device 185 may include an RFID tag 185*a* physically incorporated into the device 185, or in some way attached to the device 185. In this way, the RFID reader/writer 187*c* of the error reporting management apparatus 187 may communicate with the RFID tag 185*a* of the device 185, in order to obtain an alert notification from the device 185 or determine when the device 185 requires maintenance. The error reporting management apparatus 187 may then generate error reports according to the exemplary embodiments of this disclosure, as described above. Aspects of RFID technology, including the ability for RFID reader/writer devices to communicate with RFID tags, are understood in the art and will not be described in detail in this disclosure.

The aforementioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. An apparatus for managing error reporting for network devices, said apparatus comprising:
   a monitoring part that monitors for alert notifications received from one or more network devices, the alert notifications including comments entered by a user of a network device;
   a specify criteria interface part to receive user entry of one or more keywords; and
   a processing part that processes the alert notifications to filter the alert notifications based on the keywords entered through the specify criteria interface part, including comparing the keywords to the user-entered comments in the alert notifications, and generates and outputs an error report that indicates only specific ones of the alert notifications that include words in the user-entered comments that match the keywords entered through the specify criteria interface part and does not indicate any alert notification that does not include words in the user-entered comments that match the keywords entered through the specify criteria interface part.

2. The apparatus of claim 1, wherein the processing part associates each of the alert notifications with a priority level, based on user identification information indicating a user associated with the corresponding network device; and
   the processing part processes the alert notifications based on the associated priority levels to filter the alert notifications based on specified criteria, and generates the error report indicating only specific ones of the alert notifications matching the specified criteria, the specified criteria being a specific or higher priority level.

3. The apparatus of claim 2, wherein the apparatus stores user-priority information identifying a plurality of users and, for each of the users, a corresponding priority level, and
   in a case that the processing part determines, based on the user identification information indicating a user associated with a first network device, that a first user identified in the user-priority information is the user associated with the first network device,
   then the processing part associates the alert notification with a first priority level corresponding to the first user, as identified in the user-priority information.

4. The apparatus of claim 1, wherein the processing part associates each of the alert notifications with a priority level, and
   the apparatus selectively transmits each of the alert notifications to one of a plurality of notification destinations, based on the associated priority level of the alert notification.

5. The apparatus of claim 4, wherein the apparatus stores destination information identifying a plurality of priority levels and, for each of the priority levels, a corresponding notification destination, and
   the apparatus selectively transmits each alert notification to the notification destination corresponding to the associated priority level of the alert notification.

6. The apparatus of claim 1, wherein the apparatus stores destination information identifying a plurality of priority levels and, for each of the priority levels, a corresponding notification destination, and
   the apparatus selectively transmits each alert notification to the notification destination corresponding to the associated priority level of the alert notification.

7. The apparatus of claim 1, wherein the apparatus stores user-priority information identifying a plurality of users and, for each of the users, a corresponding priority level, and
   in a case that the processing part determines, based on the user identification information indicating a user associated with a first network device, that a first user identified in the user-priority information is the user associated with the first network device,
   then the processing part associates the alert notification with a first priority level corresponding to the first user, as identified in the user-priority information.

8. An apparatus for managing error reporting for network devices, said apparatus comprising:
   a monitoring part that monitors for alert notifications received from one or more network devices, the alert notifications including comments entered by a user of a network device;
   a specify criteria interface part to receive user entry of one or more keywords; and
   a processing part that processes the alert notifications to filter the alert notifications based on the keywords entered through the specify criteria interface part, including comparing the keywords to the user-entered comments in the alert notifications, and generates and outputs an error report that indicates only specific ones of the alert notifications that include words in the user-entered comments that match the keywords entered through the specify criteria interface part and does not indicate any alert notification that does not include words in the user-entered comments that match the keywords entered through the specify criteria interface part, wherein the processing part associates each of the alert notifications with a priority level, based on device location information indicating a current location of the corresponding network device; and the processing part processes the alert notifications based on the associated priority levels to filter the alert notifications based on the specified criteria.

9. The apparatus of claim 8, wherein the apparatus stores location-priority information identifying a plurality of office locations and, for each of the office locations, a corresponding priority level, and in a case that the processing part determines, based on the device location information indicating a current location of a first network device, that the first network device is located at a first office location identified in the location-priority information, then the processing part associates the alert notification with a first priority level corresponding to the first office location, as identified in the location-priority information.

10. A method for an error reporting management apparatus to manage error reporting, in a network to which a plurality of network devices are connected, said method comprising:

monitoring for alert notifications received from one or more network devices, the alert notifications including comments entered by a user of a network device;

providing in the error reporting management apparatus a specify criteria interface part to receive user entry of one or more keywords from a user of the error reporting management apparatus;

processing the alert notifications to filter the alert notifications based on the keywords entered through the specify criteria interface part by the user of the error reporting management apparatus, including comparing the keywords to the user-entered comments in the alert notifications, and generating and outputting an error report that indicates only specific ones of the alert notifications that include words in the user-entered comments that match the keywords entered through the specify criteria interface part and does not indicate any alert notification that does not include words in the user-entered comments that match the keywords entered through the specify criteria interface part;

associating each of the alert notifications with a priority level, based on device location information indicating a current location of the corresponding network device; and processing the alert notifications based on the associated priority levels to filter the alert notifications based on a specified criteria, and generating the error report indicating only specific ones of the alert notifications matching the specified criteria.

11. The method of claim 10, further comprising:

associating each of the alert notifications with a priority level, based on user identification information indicating a user associated with the corresponding network device; and processing the alert notifications based on the associated priority levels to filter the alert notifications based on specified criteria, and generating the error report indicating only specific ones of the alert notifications matching the specified criteria, the specified criteria being a specific or higher priority level.

12. The method of claim 10, further comprising:

associating each of the alert notifications with a priority level; and selectively transmitting each of the alert notifications to one of a plurality of notification destinations, based on the associated priority level of the alert notification.

13. A method for an error reporting management apparatus to manage error reporting, in a network to which a plurality of network devices are connected, said method comprising:

monitoring for alert notifications received from one or more network devices, the alert notifications including comments entered by a user of a network device;

providing in the error reporting management apparatus a specify criteria interface part to receive user entry of one or more keywords from a user of the error reporting management apparatus;

processing the alert notifications to filter the alert notifications based on the keywords entered through the specify criteria interface part by the user of the error reporting management apparatus, including comparing the keywords to the user-entered comments in the alert notifications, and generating and outputting an error report that indicates only specific ones of the alert notifications that include words in the user-entered comments that match the keywords entered through the specify criteria interface part and does not indicate any alert notification that does not include words in the user-entered comments that match the keywords entered through the specify criteria interface part.

14. A method for an error reporting management apparatus to manage error reporting, in a network to which a plurality of network devices are connected, said method comprising:

monitoring for alert notifications received from one or more network devices, the alert notifications including comments entered by a user of a network device;

providing in the error reporting management apparatus a specify criteria interface part to receive user entry of one or more keywords from a user of the error reporting management apparatus;

processing the alert notifications to filter the alert notifications based on the keywords entered through the specify criteria interface part by the user of the error reporting management apparatus, including comparing the keywords to the user-entered comments in the alert notifications, and generating and outputting an error report that indicates only specific ones of the alert notifications that include words in the user-entered comments that match the keywords entered through the specify criteria interface part and does not indicate any alert notification that does not include words in the user-entered comments that match the keywords entered through the specify criteria interface part;

storing location-priority information identifying a plurality of office locations and, for each of the office locations, a corresponding priority level;

determining, based on device location information indicating a current location of a first network device, that the first network device is located at a first office location identified in the location-priority information;

associating the alert notification with a first priority level corresponding to the first office location, as identified in the location-priority information; and processing the alert notifications based on the associated priority levels to filter the alert notifications based on specified criteria, and generating the error report indicating only specific ones of the alert notifications matching the specified criteria.

15. A method for an error reporting management apparatus to manage error reporting, in a network to which a plurality of network devices are connected, said method comprising:

monitoring for alert notifications received from one or more network devices, the alert notifications including comments entered by a user of a network device;

providing in the error reporting management apparatus a specify criteria interface part to receive user entry of one or more keywords from a user of the error reporting management apparatus;

processing the alert notifications to filter the alert notifications based on the keywords entered through the specify criteria interface part by the user of the error reporting management apparatus, including comparing the keywords to the user-entered comments in the alert notifications, and generating and outputting an error report that indicates only specific ones of the alert notifications that include words in the user-entered comments that match the keywords entered through the specify criteria interface part and does not indicate any alert notification that does not include words in the user-entered comments that match the keywords entered through the specify criteria interface part;

storing user-priority information identifying a plurality of users and, for each of the users, a corresponding priority level;

determining, based on user identification information indicating a user associated with a first network device, that a first user identified in the user-priority information is the user associated with the first network device;

associating the alert notification with a first priority level corresponding to the first user, as identified in the user-priority information; and processing the alert notifications based on the associated priority levels to filter the alert notifications based on specified criteria, and generating the error report indicating only specific ones of the alert notifications matching the specified criteria.

16. A method for an error reporting management apparatus to manage error reporting, in a network to which a plurality of network devices are connected, said method comprising:

monitoring for alert notifications received from one or more network devices, the alert notifications including comments entered by a user of a network device;

providing in the error reporting management apparatus a specify criteria interface part to receive user entry of one or more keywords from a user of the error reporting management apparatus;

processing the alert notifications to filter the alert notifications based on the keywords entered through the specify criteria interface part by the user of the error reporting management apparatus, including comparing the keywords to the user-entered comments in the alert notifications, and generating and outputting an error report that indicates only specific ones of the alert notifications that include words in the user-entered comments that match the keywords entered through the specify criteria interface part and does not indicate any alert notification that does not include words in the user-entered comments that match the keywords entered through the specify criteria interface part;

associating each of the alert notifications with a priority level;

storing destination information identifying a plurality of priority levels and, for each of the priority levels, a corresponding notification destination; and selectively transmitting each alert notification to the notification destination corresponding to the associated priority level of the alert notification, as indicated in the destination information.

17. A system for managing error reporting in a network to which a plurality of network devices are connected, said system comprising:

the plurality of network devices; and
an error reporting management apparatus comprising:
a monitoring part configured to monitor for alert notifications received from one or more network devices, the alert notifications including comments entered by a user of a network device;
a specify criteria interface part to receive user entry of one or more keywords; and
a processing part that processes the alert notifications to filter the alert notifications based on the keywords entered through the specify criteria interface part, including comparing the keywords to the user-entered comments in the alert notifications, and generates and outputs an error report that indicates only specific ones of the alert notifications that include words in the user-entered comments that match the keywords entered through the specify criteria interface part and does not indicate any alert notification that does not include words in the user-entered comments that match the keywords entered through the specify criteria interface part, wherein the error reporting management apparatus stores user-priority information identifying a plurality of users and, for each of the users, a corresponding priority level, and in a case that the processing part determines, based on user identification information indicating a user associated with a first network device, that a first user identified in the user-priority information is the user associated with the first network device, then the processing part associates the alert notification with a first priority level corresponding to the first user, as identified in the user-priority information.

18. The system of claim 17, wherein the processing part indicates at least one alert notification that includes the keywords entered through the specify criteria interface part in the error report.

19. The system of claim 17, wherein the processing part associates each of the alert notifications with a priority level, based on device location information indicating a current location of the corresponding network device; and the processing part processes the alert notifications based on the associated priority levels to filter the alert notifications based on specified criteria, and generates the error report indicating only specific ones of the alert notifications matching the specified criteria, the specified criteria being a specific or higher priority level.

20. The system of claim 17, wherein the error reporting management apparatus stores destination information identifying a plurality of priority levels and, for each of the priority levels, a corresponding notification destination, and the error reporting management apparatus selectively transmits each alert notification to the notification destination corresponding to the associated priority level of the alert notification.

* * * * *